US009369527B2

(12) United States Patent
Nishibori et al.

(10) Patent No.: US 9,369,527 B2
(45) Date of Patent: Jun. 14, 2016

(54) FILE SERVER, FILE SERVER CONTROL METHOD, AND STORAGE SYSTEM

(71) Applicant: Hitachi, Ltd., Tokyo (JP)

(72) Inventors: Tatsuo Nishibori, Tokyo (JP); Nobuyuki Saika, Tokyo (JP); Akira Murotani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/424,874

(22) PCT Filed: Feb. 21, 2014

(86) PCT No.: PCT/JP2014/054153
§ 371 (c)(1),
(2) Date: Feb. 27, 2015

(87) PCT Pub. No.: WO2015/125271
PCT Pub. Date: Aug. 27, 2015

(65) Prior Publication Data
US 2016/0036912 A1    Feb. 4, 2016

(51) Int. Cl.
*H04L 29/08* (2006.01)
*G06F 12/08* (2006.01)

(52) U.S. Cl.
CPC ........ *H04L 67/1097* (2013.01); *G06F 12/0813* (2013.01); *G06F 12/0866* (2013.01); *H04L 67/1031* (2013.01); *G06F 2212/1016* (2013.01); *G06F 2212/154* (2013.01); *G06F 2212/285* (2013.01); *G06F 2212/311* (2013.01); *G06F 2212/463* (2013.01); *G06F 2212/604* (2013.01)

(58) Field of Classification Search
USPC .......................................... 709/203
See application file for complete search history.

(56) References Cited

U.S. PATENT DOCUMENTS

| | | | |
|---|---|---|---|
| 2007/0083715 A1* | 4/2007 | Vanderpool | G06F 12/0817 711/141 |
| 2011/0289281 A1 | 11/2011 | Spackman | |
| 2011/0307457 A1 | 12/2011 | Ishii et al. | |
| 2012/0131278 A1* | 5/2012 | Chang | G06F 12/0893 711/118 |
| 2013/0282672 A1 | 10/2013 | Tashiro et al. | |

FOREIGN PATENT DOCUMENTS

| | | |
|---|---|---|
| WO | 2010100733 A1 | 9/2010 |
| WO | 2013157103 A1 | 10/2013 |

\* cited by examiner

*Primary Examiner* — Tu Nguyen
(74) *Attorney, Agent, or Firm* — Volpe and Koenig, P.C.

(57) ABSTRACT

Disclosed is a storage system that includes a first node and a second node. The first node and the second node are connected to a client and a storage device. The first node includes a first memory for cache data, receives data from the client, stores the data into the first memory, and controls the storing the content of the data into the storage device from the first memory in accordance with an instruction from the second node. The second node includes a second memory for the same cache data as the first memory. If the content of data in the storage device or the content of data in the second memory before the storing of the data is the same as the content of the data in the second memory, the second node instructs the first node not to store the content of the data into the storage device.

15 Claims, 11 Drawing Sheets

JOB QUEUE RESULT LIST 60

| PROCESS NUMBER | QUEUE NUMBER | FILE NAME | DETERMINATION RESULT | STATUS |
|---|---|---|---|---|
| 1 | 1 | A | WRITE | COMPLETED |
| 2 | 4 | A | DELETE | COMPLETED |
| : | : | : | : | : |

FIG. 7

UNDEDUPLICATED FILE LIST 70, 71

| LIST NUMBER | FILE NAME | FILE STORAGE LOCATION INFORMATION | STATUS |
|---|---|---|---|
| 1 | L | lll0001 | UNDEDUPLICATED |
| 2 | M | mmm0001 | UNDEDUPLICATED |
| 3 | N | nnn0001 | UNDEDUPLICATED |
| : | : | : | : |

FILE SERVER, FILE SERVER CONTROL METHOD, AND STORAGE SYSTEM

TECHNICAL FIELD

The present invention relates to a file server, a file server control method, and a storage system.

BACKGROUND ART

In recent years, it has been increasingly demanded that a large amount of file data, called, for instance, big data, be stored due to increased use of computers. Such demand is being met by improving the recording density of a storage. Further, as a large amount of file data often includes a considerable amount of file data having the same content, a technology for deduplicating file data having the same content at a node such as a file server has been under development.

As a deduplication technology, an inline deduplication technology and a post-process deduplication technology are disclosed in Patent Literature 1 (Paragraph [0025] and other parts).

CITATION LIST

Patent Literature

PLT 1: U.S. Patent Application Publication No. 2011/0289281

SUMMARY OF INVENTION

Technical Problems

File data can be deduplicated by use of the technologies disclosed in Patent Literature 1. However, a file data deduplication process is a process different from a file data read/write process. Therefore, performing the file data deduplication process degrades the performance of the file data read/write process.

In view of the above-described circumstances, it is an object of the present invention to enable a node to perform a deduplication process within a system having a plurality of nodes while minimizing the influence upon the performance of a file data read/write process of another node.

Solution to Problem

A storage system according to the present invention preferably includes a first node and a second node. The first node is connected to a client and a storage device. The second node is connected to the client and the storage device. The first node includes a first memory for storing cache data, receives first data from the client, stores the first data in the first memory, and controls the storing of content of the first data into the storage device from the first memory in accordance with an instruction from the second node. The second node includes a second memory for storing the same cache data as the first memory. If content of data stored in the storage device or content of data stored in the second memory before the storing of the first data is the same as the content of the first data stored in the second memory, the second node instructs the first node not to store the content of the first data into the storage device from the first memory.

The present invention is also contemplated as a file server and as a file server control method.

Advantageous Effects of Invention

The present invention enables a node to perform a deduplication process within a system having a plurality of nodes while minimizing the influence upon the performance of a file data read/write process of another node.

DESCRIPTION OF EMBODIMENTS

A preferred embodiment of a file server, of a file server control method, and of a storage system will now be described in detail with reference to the accompanying drawings.

Figure 1:
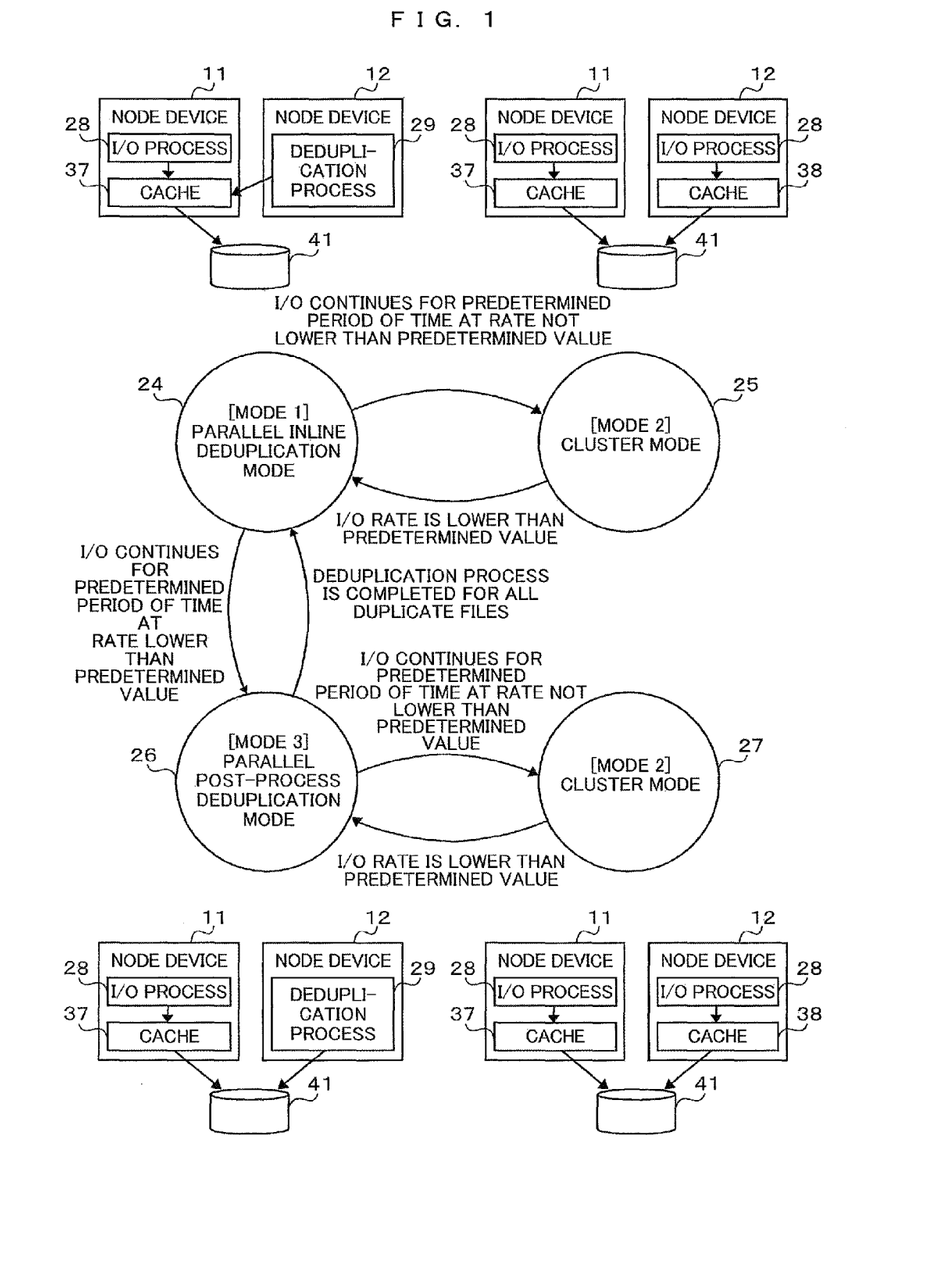
FIG. 1 is a diagram illustrating the relation between modes related to deduplication.

FIG. 1 is a schematic diagram illustrating a preferred embodiment of the present invention. More specifically, FIG. 1 shows the relation between modes related to deduplication. Node devices 11, 12, which are, for example, file servers, are capable of writing files into a disk array device 41. If the node devices 11, 12 write files having the same content into the disk array device 41 a number of times, the storage capacity of the disk array device 41 will be wastefully consumed. In this instance, the files will be deduplicated. Each of three modes available are selectively used in accordance with predetermined conditions. Modes 1 to 3 will hereinafter be distinguished from their reference numerals by parenthesizing the reference numerals. Mode 1 (24) is a parallel inline deduplication mode in which the node device 12 performs a deduplication process 29 in parallel with an I/O process 28 of the node device 11. Files written into a cache 37 during the I/O process 28 are checked for duplicate content so that non-duplicate files are written into the disk array device 41. Mode 2 (25) is a cluster mode in which the node 11 and the node 12 perform the same I/O process 28 in response to different I/O requests. Mode 2 (25) cannot deduplicate files, but can improve the performance of the I/O process 28.

In mode 3 (26), the node device 12 performs the deduplication process 29 in parallel with the I/O process 28 of the node device 11. Mode 3 (26), which performs the deduplication process 29 on a target different from the one in mode 1 (24), is a parallel post-process deduplication mode in which duplicate files written in the disk array device 41 are eliminated. The process performed in mode 2 27 is the same as the process performed in mode 2 (25). However, mode 2 27 differs from mode 2 (25) in that the former switches to mode 3 (26). If an I/O continues for a predetermined period of time at a rate higher than or equal to a predetermined value in mode 1 (24) or mode 3 (26), that is, if the load on the I/O increases, the mode switches to mode 2 (25) or mode 2 (27) in order to improve the performance of the I/O process 28. If, on the other hand, an I/O continues for a predetermined period of time at a rate lower than the predetermined value in mode 2 (25) or mode 2 27, that is, if the load on the I/O decreases, the mode switches to mode 1 (24) or mode 3 (26) in order to eliminate duplicates.

Mode 1 (24) exhibits a high speed because the deduplication process 29 is performed on the cache 37. In mode 2 (25), mode 2 (27), and mode 3 (26), duplicate files may be written into the disk array device 41; therefore, if the I/O continues for the predetermined of time at a rate lower than the predetermined value, that is, if the load on the I/O decreases, the mode switches to mode 3 (26) in order to eliminate duplicate files written into the disk array device 41. After all the duplicate files written into the disk array device 41 are eliminated, the deduplication process 29 needs to be performed only on files newly to be subjected to the I/O process 28. Hence, the mode switches to mode 1 (24).

As described above, the node device 11 performs the I/O process 28 and does not perform the deduplication process 29. This makes it possible to minimize the influence of the deduplication process 29 upon the I/O process 28. As a result, a deduplication capability can be introduced into a system that requires high I/O processing performance. Particularly, in a system configuration in which access is concentrated on some of a large number of nodes, the node device 12 that performs the deduplication process 29 can be utilized for the decentralization of I/O process.

Figure 2:
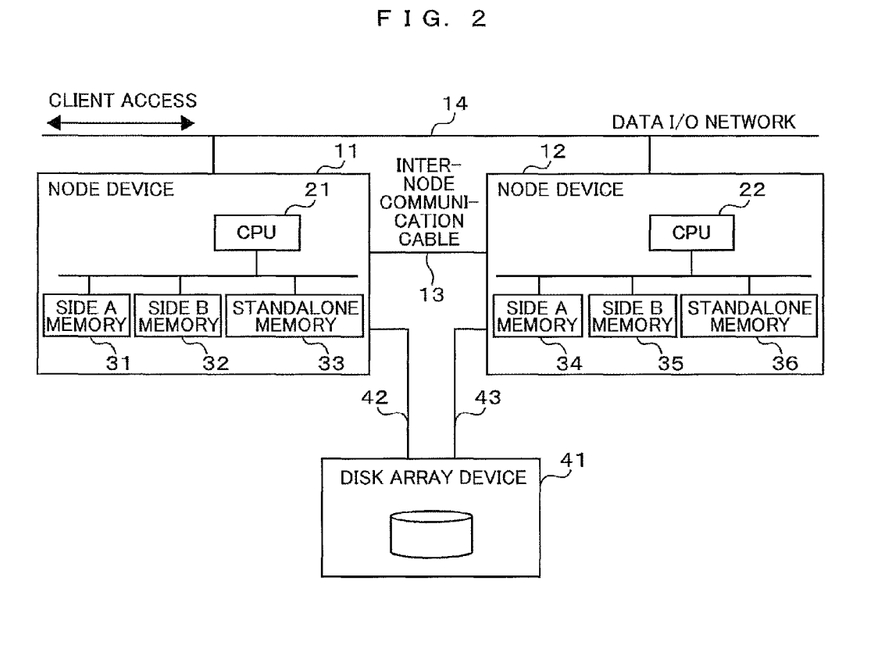
FIG. 2 is a diagram illustrating an exemplary configuration of a storage system.

FIG. 2 is a diagram illustrating an exemplary configuration of the storage system. The storage system includes a plurality of node devices 11, 12 and a disk array device 91. The plurality of node devices 11, 12 are accessed by a client (not shown) through a data I/O network 14. The disk array device 41 is accessed independently by the plurality of node devices 11, 12 respectively through cables 42, 43. Although FIG. 2 shows an example in which the storage system includes two node devices 11, 12, the storage system may alternatively include three or more node devices. Further, the node devices 11, 12 may have an alternative configuration, which will be described later with reference to FIG. 11.

The node device 11 is, for example, a file server in which a CPU 21 and three memories, namely, a side A memory 31, a side B memory 32, and a standalone memory 33, are internally connected. The CPU 21 performs, for example, an I/O process and a deduplication process. The node device 12 has the same configuration as the node device 11. The node device 11 is connected to the node device 12 with an inter-node communication cable 13 so that the CPUs 21, 22 can access the memories in the other node devices 11, 12 either directly or indirectly. Indirect access is gained when, for instance, the CPU 21 requests the CPU 22 to access a memory and receives the result of such access from the CPU 22. The side A memories 31, 34 are not only used as a cache memory into which the CPU 21 in the node device 11 writes files, but also used as a memory into which information on files is to be written. The side B memories 32, 35 are not only used as a cache memory into which the CPU 22 in the node device 12 writes files, but also used as a memory into which information on files is to be written. The standalone memories 33, 36 are memories into which the node devices 11, 12 uniquely write information. The CPU 21 writes information into the standalone memory 33. The CPU 22 writes information into the standalone memory 36.

Figure 3A:
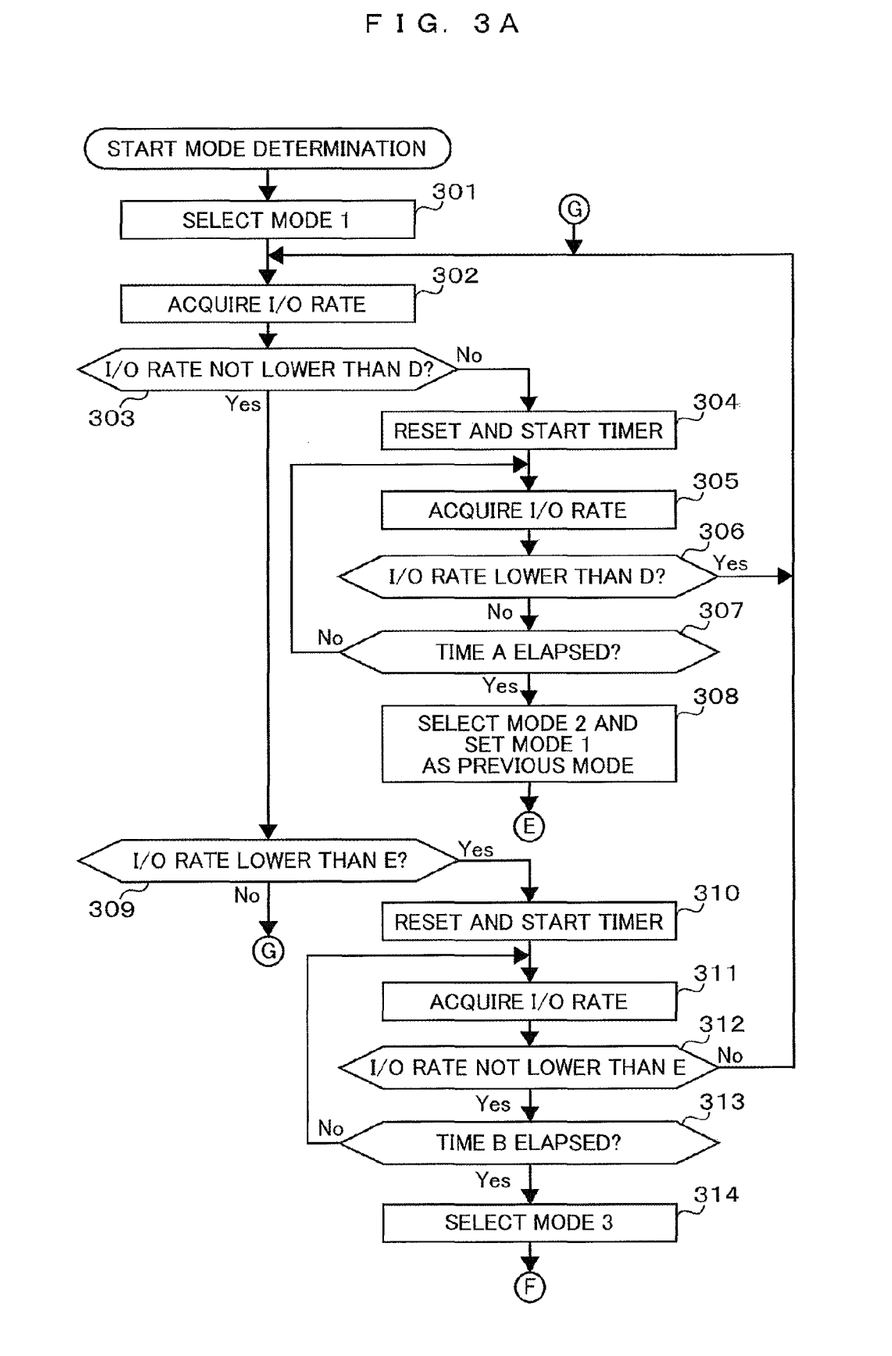
FIG. 3A is a flowchart illustrating an example of a determination process in mode 1.
Figure 3B:
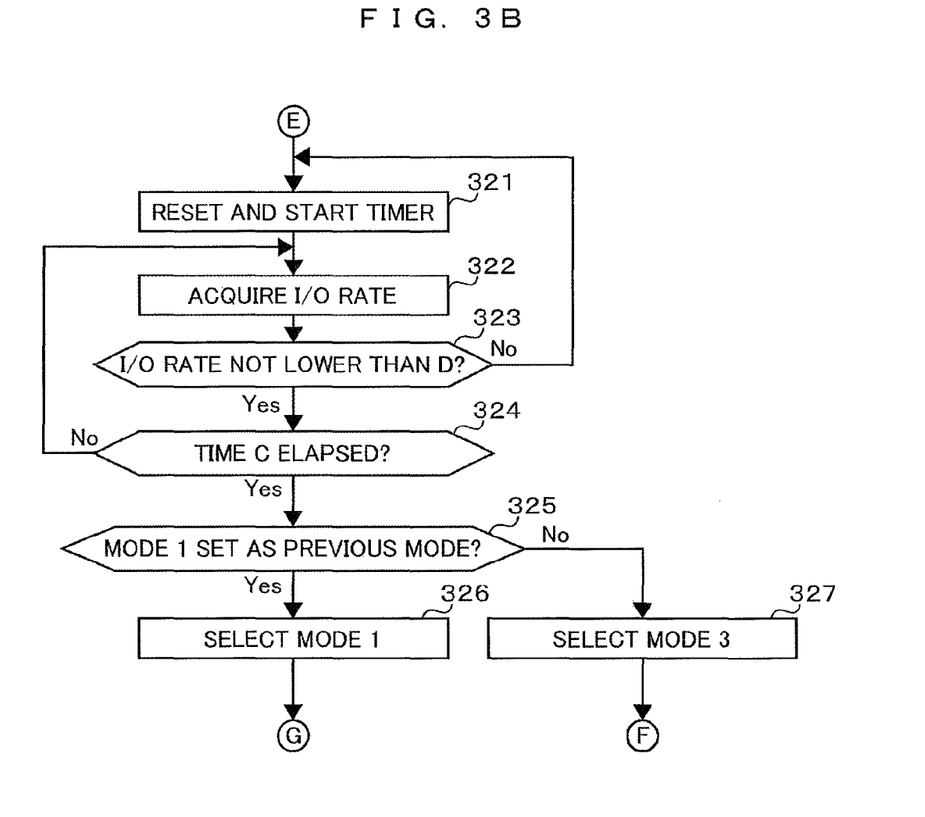
FIG. 3B is a flowchart illustrating an example of the determination process in mode 2.
Figure 3C:
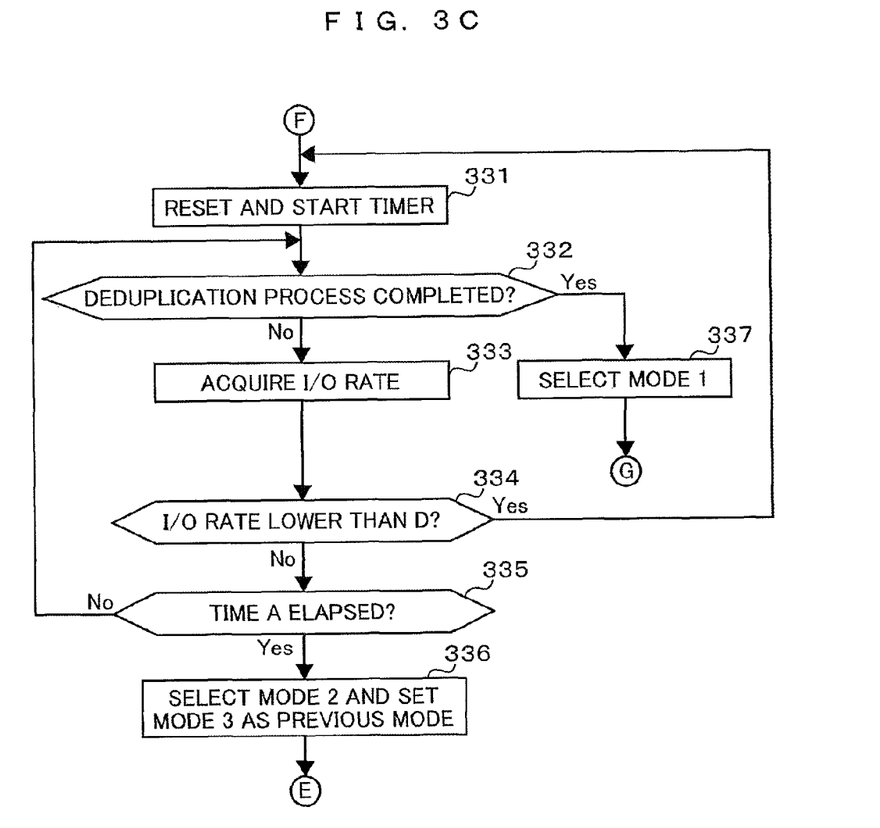
FIG. 3C is a flowchart illustrating an example of the determination process in mode 3.

The node device 11 is a dedicated device for I/O processing, and its mode varies depending on whether the node device 12 performs a deduplication process on the side A memories 31, 34, performs an I/O process, or performs a deduplication process on the disk array device 41. FIGS. 3A to 3C are flowcharts illustrating examples of a mode determination process. When a certain mode value is set, for example, mode 1 is selected, a process (not shown) is performed so that the node device 12 performs a process in accordance with the selected mode. Further, the following description assumes that the processes shown in FIGS. 3A to 3C are performed by the node device 12. Alternatively, however, a device other than the node device 12 may perform the processes and notify the node device 12 of the result of processing.

When the node devices 11, 12 are activated, they start to perform a mode determination process. First of all, the CPU 22 selects mode 1 in step 301. Mode 1 is an initial mode in which a normal condition prevails, that is, the load on the node device 11 is neither high nor low, so that an I/O process can be sufficiently performed by the node device 11. In step 302, the CPU 22 acquires the I/O rate of the node device 11. For such I/O rate acquisition purposes, the I/O rate may be measured in the node device 11 and reported to the CPU 22. In step 303, the CPU 22 compares the acquired I/O rate with a predetermined value D to determine whether the acquired I/O rate is the higher or lower. The value D may be predetermined by a user operation. The predetermined value D may be, for example, based on the maximum I/O processing speed of the node device 11 and defined by providing a margin with respect to the maximum processing speed, or equal to a value that imposes a high load on the node device 11 and cannot be fully processed by the node device 11.

If the I/O rate is determined in step 303 to be higher than or equal to the predetermined value D, it may be necessary to switch to mode 2. In such an instance, the CPU 22 resets a timer to zero to start the timer in step 304. In step 305, the CPU 22 acquires the I/O rate of the node device 11. In step 306, the CPU 22 compares the acquired I/O rate with the predetermined value D to determine whether the acquired I/O rate is the higher or lower. If the I/O rate is determined to be lower than the predetermined value D, processing returns to step 302 because the I/O rate has decreased. If, on the other hand, the I/O rate is determined to be higher than or equal to the predetermined value D, the CPU 22 determines in step 307 whether the timer indicates that time A has elapsed. That the CPU determines that time A has elapsed means the I/O rate was higher than or equal to the predetermined value D for a period of time A, that is, the I/O rate continued to be higher than or equal to the predetermined value D for the period of time A. Hence, the CPU 22 selects mode 2 in step 308 and then proceeds to step 321 of FIG. 3B. Here, the CPU 22 sets mode 1 as the previous mode in order to return to mode 1 from mode 2. Time A may be set by a user operation. Further, time A may be, for example, several seconds or may be about half a response time for which a client user can wait.

If the I/O rate is determined in step 303 to be lower than the predetermined value, the CPU 22 compares the I/O rate with a predetermined value E in step 309 to determine whether the I/O rate is the higher or lower. The value E may be predetermined by a user operation. Further, the predetermined value E may be lower than the predetermined value D and may be, for example, about half the maximum I/O processing speed of the node device 11. The predetermined value E may be set equal to a nighttime I/O rate in order to activate mode 3 during nighttime in a system that is less accessed during nighttime. Steps 310 to 313 are similar to steps 304 to 307, but are performed in order to determine whether the I/O rate of the node device 11 has continued to be lower than the predetermined value E for a period of time B. Time B may be set by a user operation. Further, time B may be, for example, several hours or may be equal to a period of time during which the nighttime I/O rate remains low. If it is determined in step 313 that time B has elapsed, the CPU 22 selects mode 3 in step 314 and then proceeds to step 331 of FIG. 3C.

FIG. 3B is a flowchart illustrating an example of a process performed after the selection of mode 2. Steps 321 to 324 are performed to determine whether the sum of the I/O rates of the node device 11 and node device 12 has continued to be lower than the predetermined value D for a period of time C. If it is determined in step 324 that time C has elapsed, the CPU 22 switches from mode 2 to mode 1 or 3 due to a decrease in the I/O rate. In step 325, the CPU 22 determines the previous mode prevailing before switching to mode 2. If the previous mode is mode 1, the CPU 22 selects mode 1 in step 326 and then returns to step 302 of FIG. 3A. That the previous mode is not mode 1 means that the previous mode is mode 3. Therefore, the CPU 22 selects mode 3 in step 327 and then returns to step 331 of FIG. 3C. Time C may be set by a user operation. Further, time C may be longer than time A or several minutes. In mode 3, the node devices 11, 12 both perform an I/O process. Therefore, the I/O rate acquired in step 322 is the sum of the I/O rates of the node devices 11, 12.

FIG. 3C is a flowchart illustrating an example of a process performed after the selection of mode 3. Steps 331 to 335 are performed to determine whether the I/O rate of the node device 11 has continued to be higher than or equal to the predetermined value D for a period of time A. They are performed to determine whether or not to switch to mode 2, and are basically the same as steps 304 to 307. However, mode 3 deduplicates files written in the disk array device 41. Thus, when all files are deduplicated, no more targets remain to be processed in mode 3. Therefore, when it is determined in step 332 that all the files written in the disk array device 41 have been deduplicated, the CPU 22 selects mode 1 in step 337 and then returns to step 302 of FIG. 3A. If it is determined in step 335 that time A has elapsed, the CPU 22 selects mode 2 in step 336, sets mode 3 as the previous mode in order to return to mode 3 from mode 2, and then proceeds to step 321 of FIG. 3B.

Figure 4:
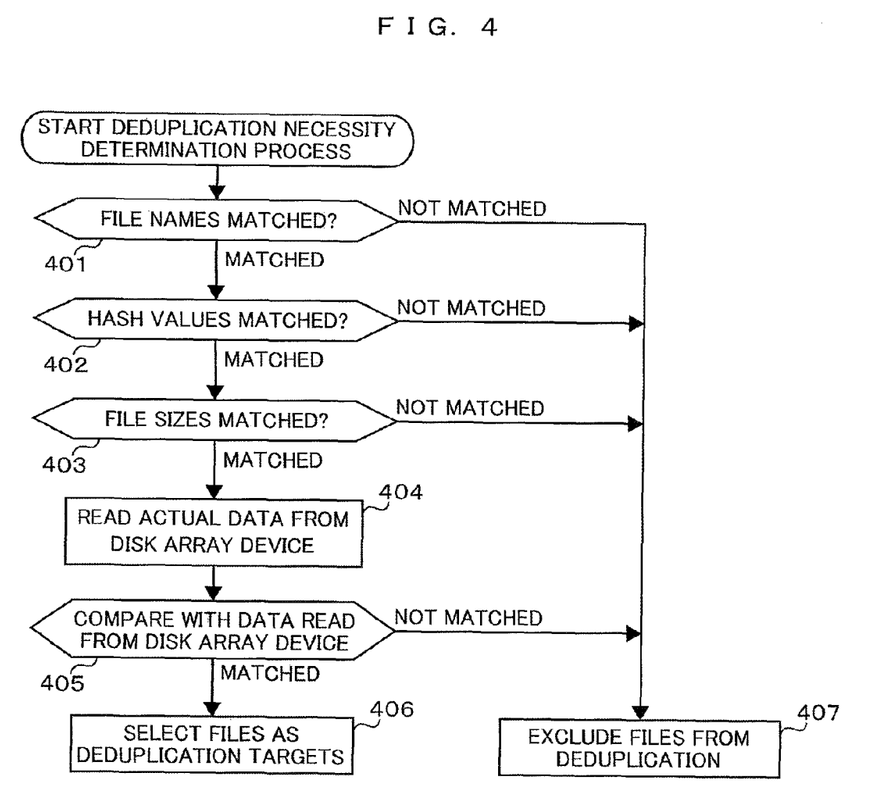
FIG. 4 is a flowchart illustrating an example of a deduplication necessity determination process.

FIG. 4 is a flowchart illustrating an example of a deduplication necessity determination process. The name of a file, a hash value of the file, and the size of the file are used as the file information for the determination. Here, if files have the same content, it is assumed that the information on the files is the same. Further, if files differ in content, it is assumed that the information on the files is not the same. It is also assumed that files do not always have the same content even if the information on the files is the same. The hash value of a file may be, for example, the CRC value of the file or a message digest such as MD5. The hash value may be any calculated value as far as it summarizes the content of the file. The above values are retained for all files while file storage locations are identified to indicate that the files are stored in the disk array device 41, the side A memories 31, 34 acting as a cache, or the side B memories 32, 35 acting as a cache, and used later as deduplication determination storage data. FIG. 4 shows the deduplication necessity determination process that is performed on files stored in the disk array device 41. However, even when the deduplication necessity determination process is performed on files stored in the side A memories 31, 34 or the side B memories 32, 35, the difference in steps 404 and 405 merely lies in the source from which relevant data is read.

In step 401, the CPU 22 first determines whether a plurality of files to be checked for duplication match in file name. If it is determined that the files do not match in file name, the CPU 22 proceeds to step 407 and excludes the files from deduplication. If, on the other hand, it is determined that the files match in file name, the CPU 22 determines in step 402 whether the files match in hash value. If it is determined that the files do not match in hash value, the CPU 22 proceeds to step 407. If, on the other hand, it is determined that the files match in hash value, the CPU 22 determines in step 403 whether the files match in file size. If it is determined that the files do not match in file size, the CPU proceeds to step 407. If, on the other hand, it is determined that the files match in file size, the CPU 22 reads actual data of the files from the disk array device 41 in step 404, and then compares the read data in step 405. If it is determined that the read data do not match in content, the CPU 22 proceeds to step 407. If, on the other hand, it is determined that the read data match in content, the CPU 22 selects the files as deduplication targets.

The deduplication necessity determination process is not limited to the one described above. For example, an alternative is to skip some of steps 401 to 403 or perform steps 401 to 403 in a different order. Further, if the files can be checked for duplication by reading and comparing only a certain portion of actual data in the files in steps 404 and 405, the data may be compared by reading such a portion of the actual data. Furthermore, if any other information is available to check for duplication, the determination process may be based on such information.

The details of a process performed to deduplicate targets will not be described here because various deduplication processes well known in the art can be performed in accordance with an employed file system and are not dependent on the present embodiment. If, for instance, two files match in content, the content of one of the two files may be deleted and replaced by a symbolic link or other pointer or by address information. Further, if three files match in content, the content of two of the three files may be deleted or the content of one of the three files may be deleted to handle the remaining two files as redundant files.

Figure 5:
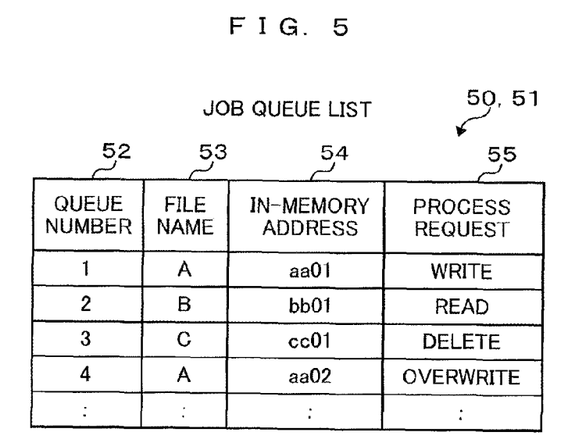
FIG. 5 shows an example of a job queue list.

Information necessary for performing the above-described determination process and the sequence of the process will now be described. FIG. 5 shows an example of a job queue list. The job queue list 50 is a queue management list in which processes to be performed in response to I/O requests that the node device 11 receives from a client through the data I/O network 14 are managed as jobs. If, for instance, the received I/O request is a write request, so-called destaging can be performed to write a target file into the disk array device 41 from the side A memory 31 by writing the target file into the side A memories 31, 34, which act as a cache, and by executing a write job registered in the job queue list 50.

The jobs are executed in the order of I/O request received. Therefore, the job queue list 50 includes a queue number 52, a file name 53, an in-memory address 54, and a process request 55. The queue number 52 indicates the ordinal number of a request. The file name 53 describes the target file to be subjected to an I/O process. The in-memory address 54 indicates where in the side A memories 31, 34 the file is located. The process request 55 describes the request, or more specifically, indicates whether the request is, for example, a write request or a read request. As the side A memories 31, 34 have the same configuration for storing data, the value of the in-memory address 54 is common to the side A memories 31, 34. The job queue list 50 is stored in the standalone memory 33.

A job queue list 51 has the same configuration as the job queue list 50. However, the job queue list 51 contains information on I/O requests received by the node device 12 in mode 2 and is stored in the standalone memory 36 of the node device 12.

Figure 6:
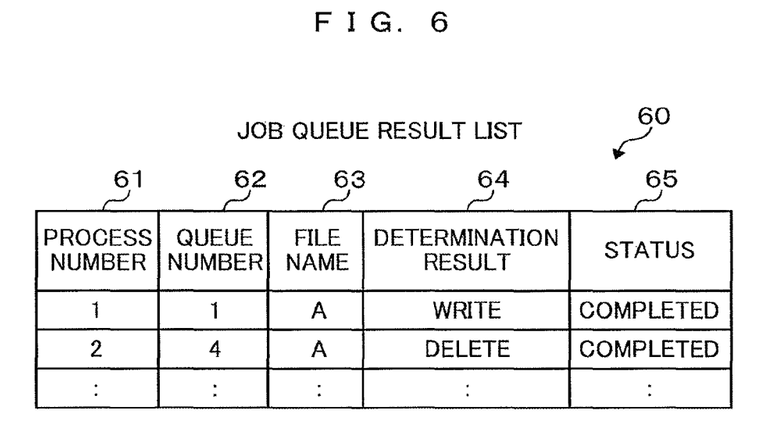
FIG. 6 shows an example of a job queue result list.

FIG. 6 shows an example of a job queue result list. The job queue result list 60 contains information used in mode 1 and manages information for deleting files that are registered in the job queue list 50 and have the same content. The use of the job queue result list 60 makes it possible to achieve deduplication by deleting any duplicate destaging concerning file content when the process request 55 in the job queue list 50 is a write request. A process number 61 is used to manage each entry in the job queue result list. A queue number 62 corresponds to the queue number 52 in the job queue list 50. Since the process requests 55 for entries whose queue numbers 52 are 1 and 4 are write requests as shown in FIG. 5, the numbers 1 and 4 are registered in the field of the queue number 62.

A file name 63 corresponds to the file name 53 in the job queue list 50. Here, file name A and file name A, which are the file names 53 of entries whose queue numbers are 1 and 4 as shown in FIG. 5, are registered. A determination result 64 indicates the result of deduplication determination. Here, a write request concerning an entry whose queue numbers 52, 62 are 1 is executed. However, an overwrite of an entry whose queue numbers 52, 62 are 4 has the same content. As duplicate file content is encountered, the job queue result list indicates that the entry will be deleted from the job queue list 50. Status 65 indicates that deduplication determination is completed and that the content of entries whose process numbers 61 are 1 and 2 is valid. The job queue result list 60 is stored in the standalone memory 36.

Figure 7:
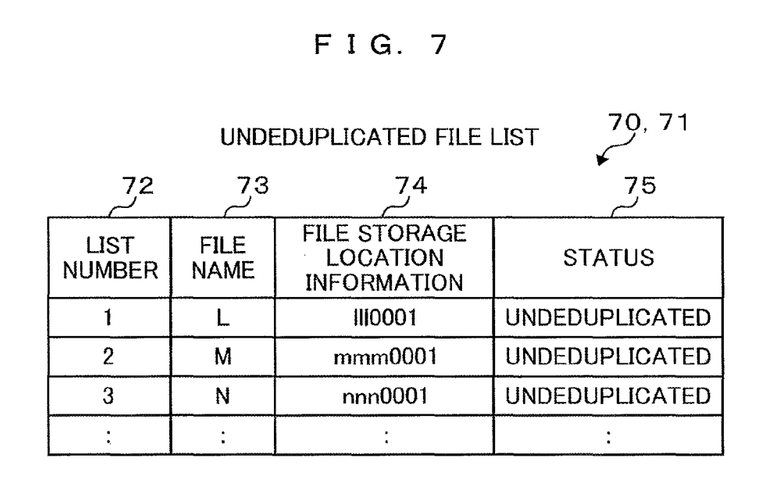
FIG. 7 shows an example of a list of undeduplicated files.

FIG. 7 shows an example of a list of undeduplicated files. Files written in the disk array device 41 in mode 2 or 3 are not targeted for deduplication determination when they are written. In other words, they are undeduplicated. If, in mode 1, the speed of the deduplication process performed by the node device 12 is lower than the speed of destaging, undeduplicated files might be written into the disk array device 41 even in mode 1. Further, even if the job queue list 50 contains a remaining write-related job that is not subjected to deduplication necessity determination when the mode switches from mode 1 to mode 2 or mode 3, undeduplicated files might be written into the disk array device 41. Undeduplicated file lists 70, 71, which list undeduplicated files, are used by the node devices 11, 12 to manage all undeduplicated files written into the disk array device 41. In mode 3, the CPU 22 views the undeduplicated file lists 70, 71 and deduplicates files in the disk array device 41. The node device 11 creates the undeduplicated file list 70 in the standalone memory 33. The node device 12 creates the undeduplicated file list 71 in the standalone memory 36. The undeduplicated file list 70 is then copied to the standalone memory 36 for the deduplication process in mode 3.

The undeduplicated file list 70 has the same configuration as the undeduplicated file list 71. A list number 72 is a number that is used to manage entries in the undeduplicated file list 70. A file name 73 indicates the name of a file written into the disk array device 41. File storage location information 74 indicates a location in the disk array device 41 at which the file is stored. Status 75 presents information indicative of whether the file is deduplicated or undeduplicated. Deduplicated file entries and file entries found to be non-duplicate are deleted from the undeduplicated file lists 70, 71. However, their deletion may be delayed. Therefore, the status 75 is capable of storing information indicative of a deduplicated file so that its entry can be deleted later.

Figure 8:
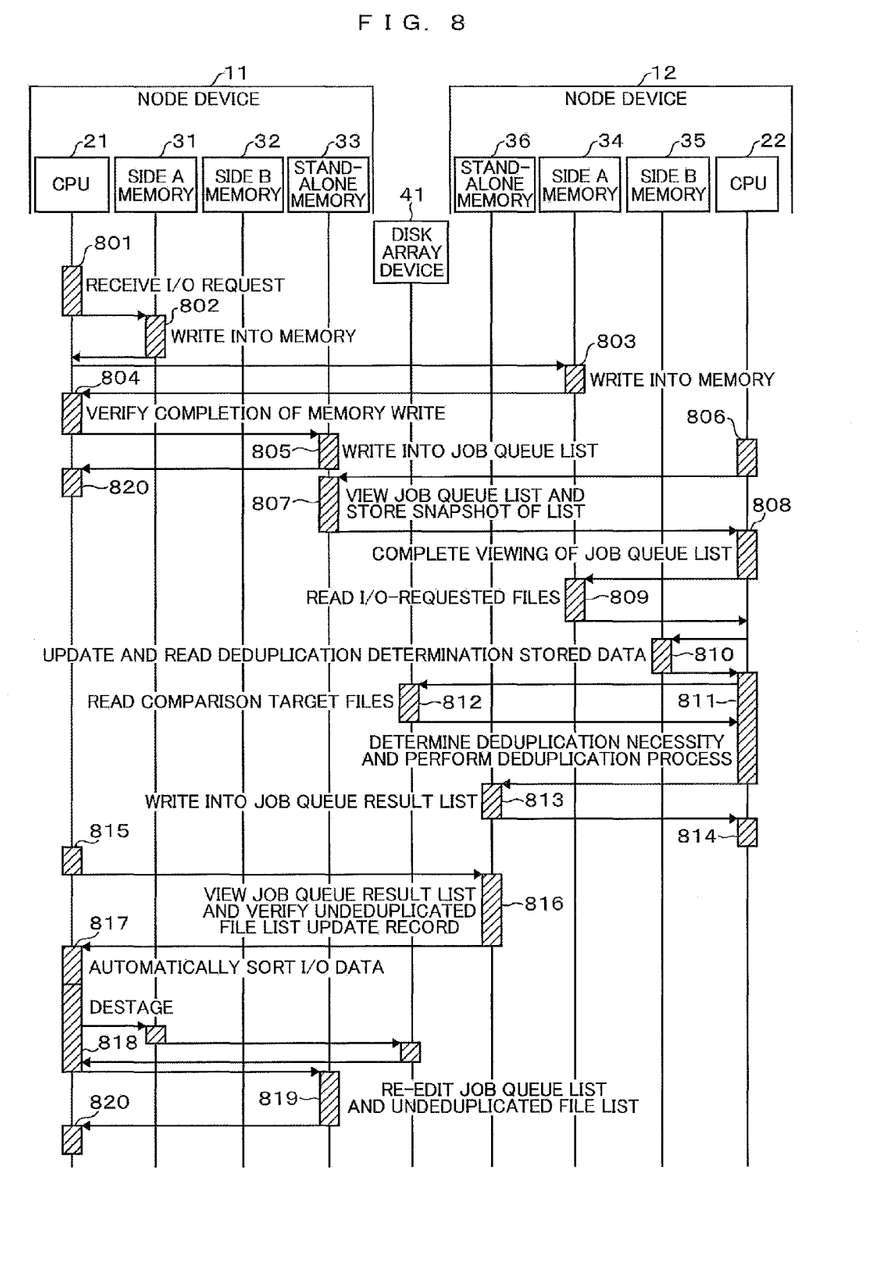
FIG. 8 is a diagram illustrating an example of a processing sequence in mode 1.

FIG. 8 is a diagram illustrating an example of a processing sequence in mode 1, which is the parallel inline deduplication mode. The node device 11 processes an I/O request. The node device 12 deduplicates files that are destaged from the side A memory 31 in the node device 11 to the disk array device 41. The reference numeral assigned to each process within a sequence will hereinafter be parenthesized. Upon receipt of an I/O request (801) indicative of a write, the CPU 21 of the node device 11 writes a file designated by the I/O request into the side A memory 31 (802) and into the side A memory 34 (803) for duplexing purposes. In this instance, the CPU 21 may directly write the file into the side A memory 34 in the node device 12 in accordance with the internal structure of the node device 12 or may request the CPU 22 to perform the write. When the completion of the memory write is verified (804), the CPU 21 writes information into each field of the job queue list 50 (805). Subsequently, the CPU 21 goes into a standby state to wait for the next I/O request, processes the next I/O request if it is already received, or performs a different process (820).

Upon receipt of a certain notification from the node device 11 or in a voluntary manner under predetermined conditions irrelevant to the process of the node device 11, the CPU 22 in the node device 12 starts to perform a deduplication process (806) from a standby state or from another process. The CPU 22 views the job queue list 50 in the standalone memory 33 and stores a snapshot of the viewed job queue list 50 in one of the memories in the node device 12 (807) because the job queue list 50 is updated as needed by the CPU 21. Upon completion of viewing of the job queue list 50 (808), the CPU 22 reads I/O-requested files (809), that is, the files written by the memory write (803). The CPU 22 performs an update by writing the file names of the I/O-requested files and other relevant information as the deduplication determination storage data, and reads already written deduplication determination storage data (810).

In accordance with the read deduplication determination storage data, the CPU 22 determines the necessity of deduplication and performs a deduplication process (811). The CPU 22 performs the processing steps described with reference to FIG. 4, to read comparison target files from the disk array device 41 as needed in the manner described in step 404 (812). In this instance, the comparison target files may be read from the side A memory 34 or the side B memory 35. The CPU 22 thereafter writes the result of deduplication determination in the job queue result list 60 in the standalone memory 36 (813), and then goes into a standby state or returns to another process (814).

Upon receipt of a certain notification from the node device 12 or in a voluntary manner on a periodic basis or under other predetermined conditions irrelevant to the process of the node device 12, the CPU 21 in the node device 11 starts to perform a destaging process (815) from a standby state or from another process such as an I/O process. The CPU 21 not only views the job queue result list 60, which was, for example, written into (813), but also views the undeduplicated file list 70 in the standalone memory 36 (816). As described with reference to FIG. 6, the job queue result list 60 contains information on a queue number 62. Therefore, I/O data is sorted (817) by determining whether or not to execute a job for an entry having the corresponding queue number 52 indicated in the job queue list 50. The result of sorting is then used to destage non-duplicate files (818) without destaging the content of duplicate files. In destaging (818), files are read from the side A memory 31 and written into the disk array device 41. The content of duplicate files will not be destaged.

However, as mentioned earlier, a pointer, address information, or the like may be written into the disk array device 41 to permit access.

After the destaging (818), the CPU 21 deletes from the queue list 50 (818) entries that are already processed during the destaging process including a duplicate file process, and deletes from the undeduplicated file list 70 (819) entries whose status 75 was found to be "deduplicated" when the undeduplicated file list 70 in the standalone memory 36 was viewed (816). Subsequently, the CPU 21 goes into a standby state or returns to another process such as an I/O process (814). File read and other I/O operations will not be described here because they are irrelevant to deduplication.

Figure 9:
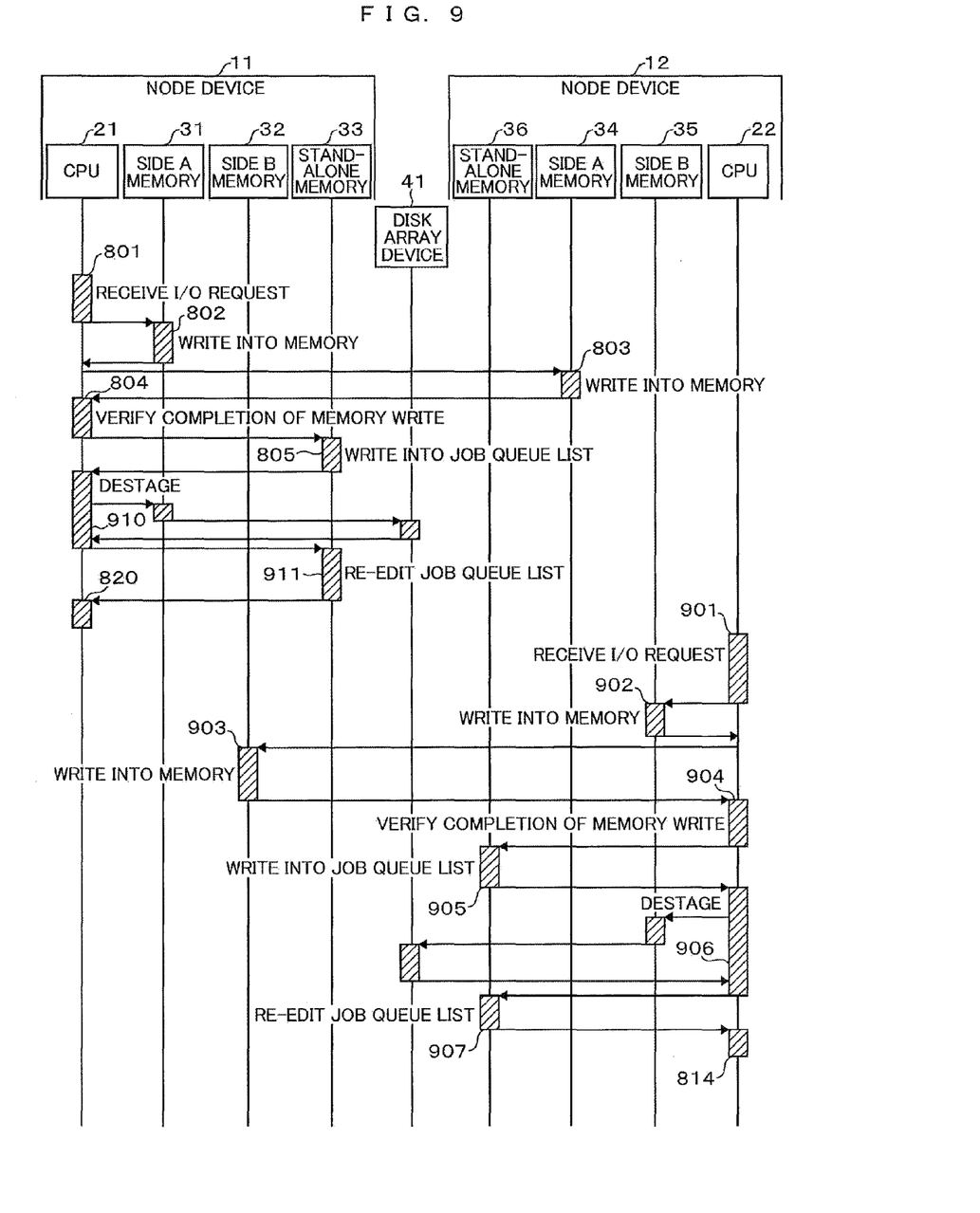
FIG. 9 is a diagram illustrating an example of a processing sequence in mode 2.

FIG. 9 is a diagram illustrating an example of a processing sequence in mode 2, which is the cluster mode. High processing performance is achieved when the node devices 11, 12 independently perform different processes. Processes identical with those shown in FIG. 8 are designated by the same reference numerals as those in FIG. 8. More specifically, the processes ranging from the I/O request reception (801) to the write into the job queue list 50 (805) and the return to a standby state and the like (820) are the same as those described with reference to FIG. 8. When a destaging process is performed (818) as shown in FIG. 8, the content of duplicate files is not destaged. However, when a destaging process is performed (910) as shown in FIG. 9, all written files registered in the job queue list 50 are destaged including duplicate files. Accordingly, the CPU 21 deletes entries processed during destaging (910) from the job queue list 50, and adds (911) information on the deleted file entries to the undeduplicated file list 70 because they are undeduplicated. Even if any entry of a file remains in the job queue list 50 when the mode switches from mode 1 to mode 2, the file is destaged here, deleted from the job queue list 50, and registered in the undeduplicated file list 70.

Processes ranging from an I/O request reception (901) to a write into a job queue list 51 (905) are similar to the processes ranging from the I/O request reception (801) to the write into the job queue list 50 (805) except that the former processes handle the side B memories 32, 35 and the job queue list 51 as processing targets. Further, a destaging process (906) and a job queue list re-editing process (907) are similar to the destaging process (910) and the job queue list re-editing process (911) except that the former processes handle the side B memories 32, 35, the job queue list 51, and the undeduplicated file list 71 as processing targets. Subsequently, the CPU 22 goes into a standby state or returns to another process (814).

As described above, in mode 2, the node devices 11, 12 are capable of processing I/O requests in a perfectly independent manner.

Figure 10:
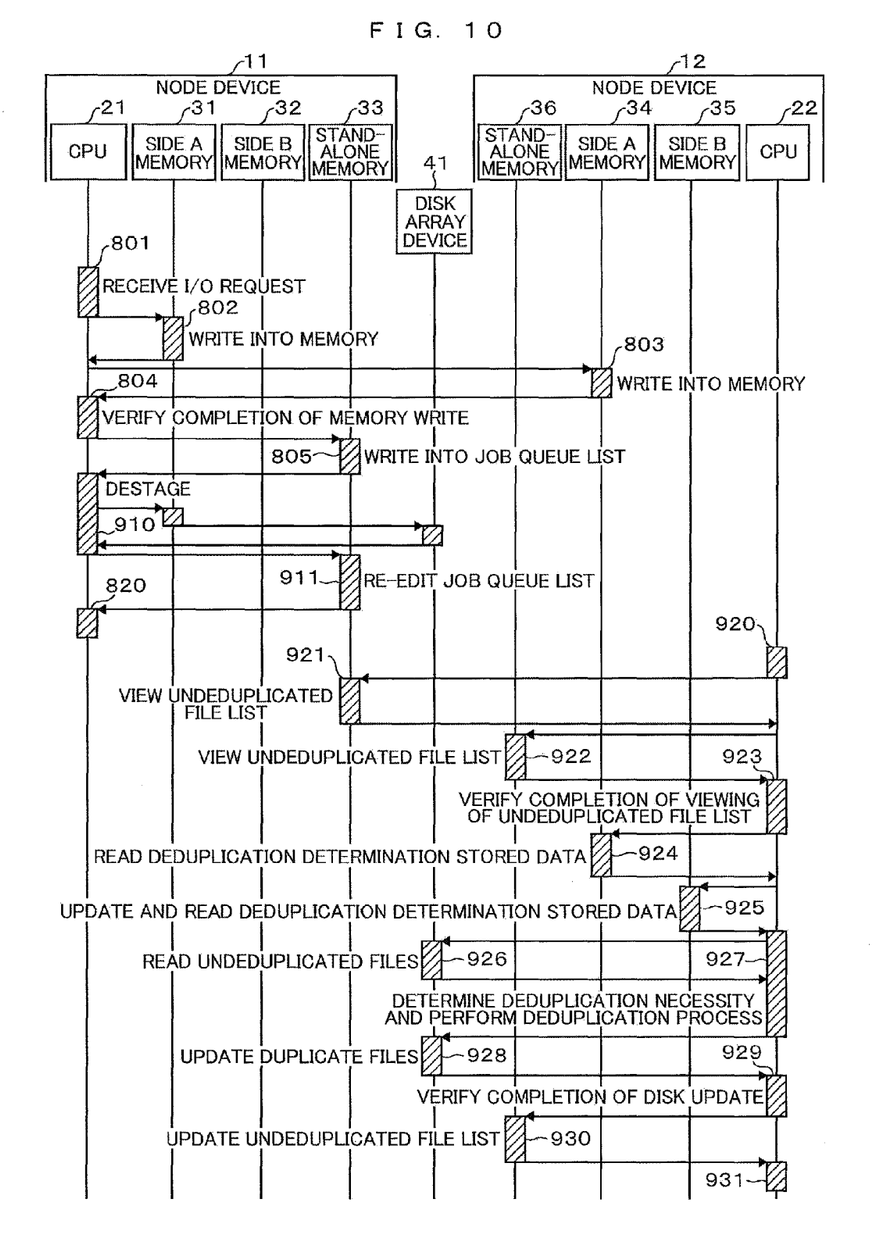
FIG. 10 is a diagram illustrating an example of a processing sequence in mode 3.

FIG. 10 is a diagram illustrating an example of a processing sequence in mode 3, which is the parallel post-process deduplication mode. The node device 11 processes an I/O request. The node device 12 deduplicates files written into the disk array device 41. As the processes of the node device 11 are the same as in mode 2, they are assigned the same reference numerals as in mode 2. Upon receipt of a certain notification from the node device 11 or in a voluntary manner under predetermined conditions irrelevant to the process of the node device 11, the CPU 22 in the node device 12 starts to perform a deduplication process (920) from a standby state or from another process. The CPU 22 views the undeduplicated file list 70 in the standalone memory 33 (921), copies the undeduplicated file list 70 to the standalone memory 36, views the undeduplicated file list 71 in the standalone memory 36 (922), and verifies the completion of viewing of both undeduplicated file lists 70, 71 (923). In this manner, the CPU 22 acquires information on undeduplicated files written from the node device 11 and information on undeduplicated files written from the node device 12.

The CPU 22 reads deduplication determination storage data concerning files written by the node device 11 from the side A memory 34 (924). The CPU 22 then adds the read data to the deduplication determination storage data in the side B memory 35 for an update and reads already written deduplication determination storage data (925). In this manner, the CPU 22 acquires the file names and other information on all files written from the node device 11 and all files written from the node device 12. Next, the CPU 22 determines in accordance with the deduplication determination storage data whether the files registered in the undeduplicated file lists 70, 71 need to be deduplicated, and then performs a deduplication process (927). The CPU 22 performs the processing steps described with reference to FIG. 4 to read undeduplicated files and comparison target files from the disk array device 41 as needed (926). As a result of the deduplication process, the CPU 22 updates duplicate files in the disk array device 41 (928) and verifies the completion of update (929). For example, a plurality of duplicate files may be deleted except one file and replaced by a pointer to the remaining file or by address information.

When files registered in the undeduplicated file list 71 are deduplicated, the CPU 22 deletes the associated file entries from the undeduplicated file list 71, and when files registered in the undeduplicated file list 70 are deduplicated, the CPU 22 changes the status 75 of the undeduplicated file list 70 in the standalone memory 36 to "deduplicated" (930). In response to such changes, as already described with reference to FIG. 8, the CPU 21 verifies the undeduplicated file list 70 in the standalone memory 36 (816), and updates the undeduplicated file list 70 in the standalone memory 33 accordingly (819). If the undeduplicated file lists 70, 71 contain a large number of target files, an alternative would be to divide the target files into two or more groups and repeatedly perform processes ranging from the deduplication necessity determination and deduplication process (927) to the undeduplicated file list update process (930). Upon completion of the undeduplicated file list update process, the CPU 22 goes into a standby state or returns to another process (931).

As described above, during a normal I/O operation, the parallel inline deduplication mode makes it possible to let a second node deduplicate files in parallel with an I/O process. In this instance, the second node uses dually written data in a cache so that the influence upon the I/O process will be minimized. Further, I/O processing capability can be improved in the cluster mode by halting the deduplication process only during a period during which a high-speed I/O operation is required. Furthermore, the parallel post-process deduplication mode makes it possible to deduplicate files written during the cluster mode. This makes it possible to deduplicate files without sacrificing the I/O processing performance in use applications where the I/O rate significantly varies.

Figure 11:
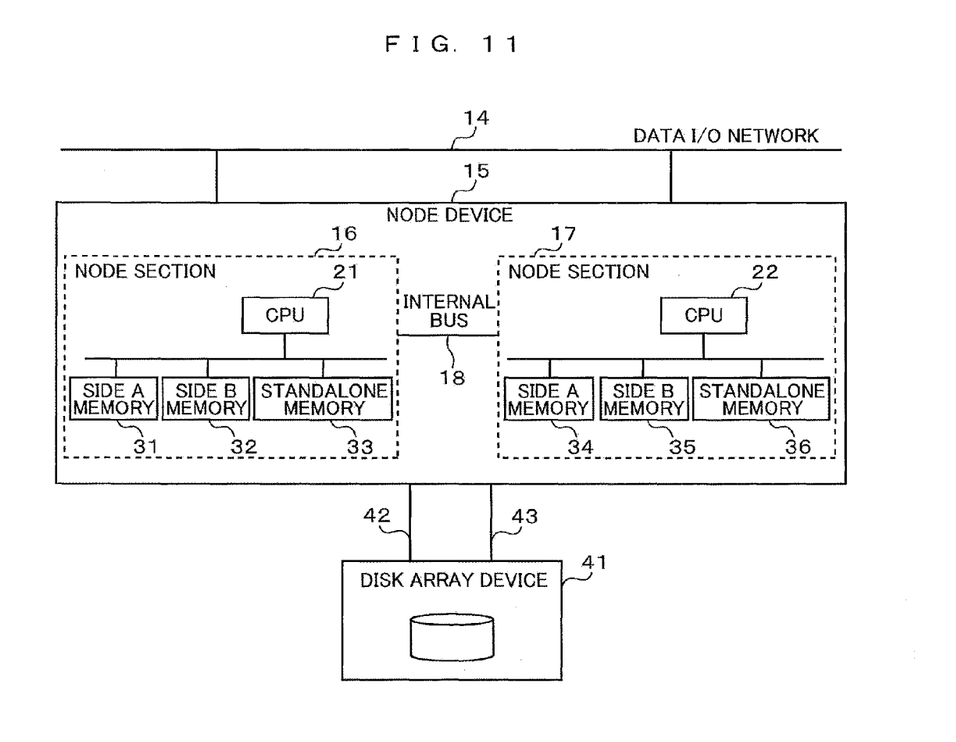
FIG. 11 is a diagram illustrating another exemplary configuration of the storage system.

The preferred embodiment, which has been described above, can be variously modified for implementation. For example, although FIG. 2 shows a configuration in which the node devices 11, 12 are interconnected with the inter-node communication cable 13, three or more node devices may be included in the configuration. When the configuration includes three or more node devices, two or more node devices 11 may be used while using one node device 12. Further, as shown in FIG. 11, node sections 16, 1.7 included in a node device 15 may be interconnected with an internal bus 18. In this configuration, the node section 16 performs the same process as the node device 11, and the node section 17 performs the same process as the node device 12. One node device 15 may include three or more node sections. Moreover, the configuration may include a plurality of node devices having a plurality of node sections. In this configuration, one node section performs the same process as the node device 12.

The node devices 11, 12 or the node sections 16, 17 include separate CPUs 21, 22, which are regarded as separate physical CPUs. However, an alternative is to divide a physical CPU into two logical CPUs and use them in place of the CPUs 21, 22. Here, the CPUs 21, 22 need to remain unaffected by each other's processing load. Therefore, an upper limit may be placed on the throughput of each logical CPU to guarantee the lower-limit throughput of the other logical CPU. Further, the side A memory 31, the side B memory 32, and the standalone memory 33 may be separate memory chips or may be separate regions of one memory chip. The side A memory 34, the side B memory 35, and the standalone memory 36 may also be separate memory chips or may also be separate regions of one memory chip.

REFERENCE SIGNS LIST 11, 12, 15 ... Node device
21, 22 ... CPU
31, 34 ... Side A memory
32, 35 ... Side B memory
33, 36 ... Standalone memory
41 ... Disk array device
50, 51 ... Job queue list
60 ... Job queue result list

The invention claimed is:

1. A storage system comprising:
a first node connected to a client and a storage device; and
a second node connected to the client and the storage device;
wherein the first node includes a first memory for storing cache data, receives first data from the client, stores the first data in the first memory, and controls storing content of the first data into the storage device from the first memory in accordance with an instruction from the second node; and
wherein the second node includes a second memory for storing the same cache data as the first memory, and if content of data stored in the storage device or content of data stored in the second memory before the storing of the first data is the same as the content of the first data stored in the second memory, instructs the first node not to store the content of the first data into the storage device from the first memory.

2. The storage system according to claim 1,
wherein, in a first mode, if the content of the data stored in the storage device or the content of the data stored in the second memory before the storing of the first data is the same as the content of the first data stored in the second memory, the second node instructs the first node not to store the content of the first data into the storage device from the first memory;
wherein, in a second mode, the second node receives second data from the client and stores the second data into the storage device; and
wherein, in a third mode, if a plurality of pieces of data stored in the storage device have the same content, the second node deletes a plurality of pieces of data except at least one of the plurality of pieces of data.

3. The storage system according to claim 2,
wherein, in the first mode, if an I/O received from the client by the first node is at a rate lower than a predetermined rate for a predetermined period of time, the second node switches to the third mode; and
wherein, in the third mode, when all pieces of data that are stored in the storage device and have the same content have been deleted except at least one piece of data, the second node switches to the first mode.

4. The storage system according to claim 3,
wherein, in the first mode or in the third mode, if an I/O received from the client by the first node is at a rate higher than or equal to a predetermined rate for a predetermined period of time, the second node switches to the second mode; and
wherein, in the second mode, if an I/O received from the client by the first node and by the second node is at a rate lower than a predetermined rate for a predetermined period of time, the second node switches to the first or third mode, whichever is selected before switching to the second mode.

5. The storage system according to claim 4,
wherein the first node includes a third memory, stores into the third memory a job for storing the first data into the storage device from the first memory in accordance with an I/O received from the client by the first node, and deletes the job in accordance with a determination result in a fourth memory of the second node; and
wherein the second node includes the fourth memory, and if, in the first mode, the content of the data stored in the storage device or the content of the data stored in the second memory before the storing of the first data is the same as the content of the first data, stores a determination result, indicative of the same content, into the fourth memory.

6. The storage system according to claim 5,
wherein, in the second mode and in the third mode, the first node stores information on data that has been stored in the storage device into the third memory; and
wherein, in the second mode, the second node stores information on data that has been stored in the storage device into the fourth memory.

7. The storage system according to claim 6,
wherein, in the third mode, if the information on the data, which is stored in the third and fourth memories, indicates that a plurality of pieces of data stored in the storage device have the same content, the second node deletes the plurality of pieces of data except at least one of the plurality of pieces of data.

8. A file server connected to a client, a storage device, and other file server, the file server comprising:
a first memory;
wherein first data, that the other file server is requested to store into the storage device, is stored in the first memory; and
wherein, if content of data stored in the storage device or content of data stored in the first memory before the storing of the first data is the same as content of the first data stored in the first memory, the file server instructs the other file server not to store the content of the first data into the storage device.

9. The file server according to claim 8,
wherein, in a first mode, if the content of the data stored in the storage device or the content of the data stored in the first memory before the storing of the first data is the same as the content of the first data stored in the first memory, the file server instructs the other file server not to store the content of the first data into the storage device;

wherein, in a second mode, the file server receives second data from the client and stores the second data into the storage device; and wherein, in a third mode, if a plurality of pieces of data stored in the storage device have the same content, the file server deletes the plurality of pieces of data except at least one of the plurality of pieces of data.

10. The file server according to claim 9, wherein, in the third mode, when all pieces of data that are stored in the storage device and have the same content have been deleted except at least one piece of data, the file server switches to the first mode.

11. The file server according to claim 10, further comprising:

a second memory;

wherein, in the first mode, if the content of the data stored in the storage device or the content of the data stored in the first memory before the storing of the first data is the same as the content of the first data, the file server stores a determination result, indicative of the same content, into the second memory in such a manner that the other file server can acquire the determination result.

12. A file server control method for controlling a file server connected to a client, a storage device, and other file server and including a first memory for storing first data that the other file server is requested to store into the storage device, the file server control method comprising the steps of:

determining whether the content of the data stored in the storage device or the content of the data stored in the first memory before the storing of the first data is the same as the content of the first data stored in the first memory; and instructing the other file server not to store the content of the first data into the storage device if the data has been determined to have the same content.

13. The file server control method according to claim 12, comprising the steps of:

in a first mode, determining whether the content of the data stored in the storage device or the content of the data stored in the first memory before the storing of the first data is the same as the content of the first data stored in the first memory; and instructing the other file server not to store the first data into the storage device if the data has been determined to have the same content;

in a second mode, receiving second data from the client; and storing the second data into the storage device; and in a third mode, determining whether a plurality of pieces of data stored in the storage device have the same content; and deleting the plurality of pieces of data except at least one of the plurality of pieces of data if the plurality of pieces of data have been determined to have the same content.

14. The file server control method according to claim 13, comprising the steps of:

in the third mode, determining whether all pieces of data that are stored in the storage device and have the same content have been deleted except at least one piece of data; and switching to the first mode if the deletion is completed.

15. The file server control method according to claim 14, wherein the file server further includes a second memory, the file server control method comprising the steps of:

in the first mode, determining whether the content of the data stored in the storage device or the content of the data stored in the first memory before the storing of the first data is the same as the content of the first data by checking a file name of the data, a file size of the data, a hash value of the data, or a combination of the file name, file size, and hash value of the data; and storing a determination result, indicative of the same content, into the second memory in such a manner that the other file server can acquire the determination result if the data are determined to have the same content.

* * * * *